United States Patent Office 2,754,177
Patented July 10, 1956

2,754,177

B-AMINOBORAZOLE COMPOUNDS AND THEIR PREPARATION

Jack R. Gould, Morristown, N. J., assignor to Reaction Motors, Inc., Rockaway, N. J., a corporation of New Jersey No Drawing. Application March 15, 1954,
Serial No. 416,390

15 Claims. (Cl. 23—190)

The present invention relates to a new class of chemical compounds useful primarily as rocket fuels or fuel additives although useful for other purposes as well. It also relates to a process for their preparation.

The new class of compounds discovered by the present inventor is identified as the B-aminoborazoles. These new compounds generally comprise boron-substituted borazoles and halogenoborazoles of the empirical formulation:

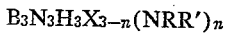

The completely substituted borazoles possess the general symmetrical formula:

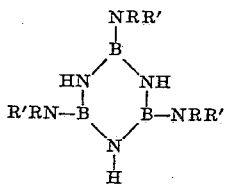

In both these formulae, R and R' are alkyl (such as methyl, ethyl or the like), aryl, alkaryl, aralkyl or hydrogen, and X is halogen. All compounds falling within the scope of the present invention are derivable from the B-trihalogenoborazoles, $B_3N_3H_3X_3$ (where X can be any halogen atom).

Methods for the preparation of amino derivatives of the simple non-cyclic boron compounds and the boron hydrides have long been known to the art. The literature contains descriptions of numerous aminoboron compounds such as $(CH_3)_2NBCl_2$, $(C_2H_5)_2NBCl_2$, $(CH_3)_3NBH_3$, $(CH_3)_2NBH_2$, $[(CH_3)_2N]_2BH$ $[(CH_3)_2N]_3B$, $NH_2B_2H_5$, $B_2H_4(NH_2)_2$, $CH_3NHB_2H_5$, $(CH_3)_2NB_2H_5$, $(CH_3)_2NB_2H_4Cl$, $B_4H_8(NH_2)_2$ and $B_4H_4(NH_2)_6$. The reported derivatives of borazole, $B_3N_3H_6$, have included alkylated, arylated, halogenated and hydrated compounds. The substance of the present invention represents a further and novel contribution to the chemistry of boron compounds in general and borazole chemistry in particular.

It is, therefore, an object of the present invention to provide a new class of chemical compounds, the B-aminoborazoles.

It is another object of the present invention to provide a process for the preparation of the class of chemical compounds B-aminoborazoles.

It is another object of the present invention to provide a new class of chemical compounds, the B-tris-aminoborazoles (B,B',B''-triaminoborazoles).

It is another object of the present invention to provide a process for the preparation of the class of chemical compounds B-tris-aminoborazoles.

It is another object of the present invention to provide the chemical compound B-triaminoborazole (B,B',B''-triaminoborazole), the first member of the series of B-tris-aminoborazole compounds, and a method for its preparation.

It is another object of the present invention to provide the new chemical compound B-tris-(dimethylamino)-borazole and a method for its preparation.

It is also an object of the present invention to provide the chemical compound B-tris-(diethylamino)-borazole and a method for its preparation.

It is another object of the present invention to provide the chemical compound B-tris-(monomethylamino)-borazole and a method for its preparation.

B-aminoborazole compounds are conveniently prepared in the present invention by contacting a B-trihalogenoborazole with the appropriate amine at temperatures which may be in the range of −80° to +200° C. and are in general governed by the boiling points of the reactants. Usually, ambient temperatures or subambient temperatures are quite satisfactory. The reaction may be conducted in the presence of an excess of amine or an inert solvent according to the following equation:

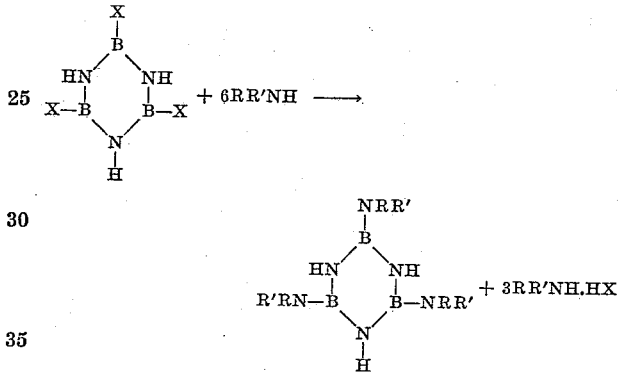

where R and R' equal alkyl, aryl, alkaryl, aralkyl or hydrogen, and where X may be fluoride, chloride, bromide or iodide.

As examples of the application of the foregoing process to the preparation of B-triaminoborazoles, the following new compounds were prepared:

1. B-triaminoborazole.
2. B-tris-(dimethylamino)-borazole.
3. B-tris-(diethylamino)-borazole.
4. B-tris-(monomethylamino)-borazole.

Use of less than the theoretical quantities of the respective amines in these reactions with B-trihalogenoborazoles would result, under the conditions of the process described by the present invention, in partial substitution of halogen aoms by amino groups on the borazole ring, and give subsequently the B-monoamino-B',B''-dihalogenoborazoles and B,B'-diamino-B''-monohalogenoborazoles as well as the B-tris-aminoborazoles whose preparations are specifically described in the following examples:

*Example 1.—B-triaminoborazole*

In a dry, round-bottomed flask cooled with a −78° bath, 20.8 g. of B-trichloroborazole was contacted with 200 cc. of liquid ammonia. The reaction was instantaneous and vigorous. After subsequent distillation of the excess ammonia, a 95% yield of B-triaminoborazole was obtained in accordance with the following equation:

$B_3N_3H_3Cl_3 + 6NH_3 \rightarrow B_3N_3H_3(NH_2)_3 + 3NH_4Cl$

*Example 2.—B-tris-(dimethylamino)-borazole*

A solution of 19.4 grams (0.43 mole) of dimethylamine in 200 cc. of dry benzene was placed in a 1-liter, three-necked flask equipped with a mercury-sealed mechanical stirrer, a dropping funnel and a −78° condenser protected from moisture by a tube containing a drying agent. Stirring was started and a solution of 9.9 grams (0.054 mole) of B-trichloroborazole in 200 cc. of benzene was added from the dropping funnel over a fifteen minute period of time. Spontaneous evolution of heat and copious formation of a precipitate were observed. Stirring for one and one-half hours at ambient temperature was followed by filtration under anhydrous conditions and by extraction of the precipitate with dry benzene. The original filtrate and the extracts were combined and the benzene removed under vacuum, leaving 8.2 grams of halogen-free B-tris-(dimethylamino)-borazole (theoretical yield, 11.2 grams).

It had a wide melting range, 105 to 140° C.; but purification was readily achieved by resublimation at 95° C./2 mm. The sublimate, obtained in the form of colorless needles, melted sharply at 112.0° C. to 113° C.

*Example 3.—B-tris-(diethylamino)-borazole*

To a solution of 35 grams (0.48 mole) of freshly-distilled diethylamine (B. P. 55.5 to 56.5° C.) in 250 cc. of dry benzene in a 1-liter, three-necked flask equipped with a mercury-sealed mechanical stirrer, a dropping funnel and a water-cooled reflux condenser, was added, during a period of fifteen minutes, a solution of 10.2 grams (0.055 mole) of B-trichloroborazole in 250 cc. of dry benzene. An exothermal reaction occurred and was accompanied by deposition of solids. After the mixture was stirred for two hours, it was allowed to stand overnight and was filtered through sintered glass without exposure to moist air. The precipitate was extracted with benzene and the extracts were combined with the filtrate. Removal of the benzene from the solution under vacuum gave 8.8 grams of B-tris-(diethylamino)-borazole, an amber-colored liquid which, upon distillation, boiled at 120° C./2mm.

*Example 4.—B-tris-(monomethylamino)-borazole*

A solution of about 20 cc. of monomethylamine in 200 cc. of dry benzene was treated at room temperature with 9.3 g. of B-trichloroborazole in 300 cc. of dry benzene. The thick, gelatinous reaction mixture which resulted was extracted with benzene. Removal of the benzent from the extract resulted in a 74% yield of halogen-free tris - (monomethylamino) - borazole. The crude product melted at 85–105° C.

The foregoing detailed descriptions are for the purposes of illustration only and are not to be construed as limiting the scope of the present invention. The alkyl, aryl, alkaryl or aralkyl groups bonded to the nitrogen atoms of the borazole compounds can, for example, contain any number of additional functional groups, such as —OH, —OCH$_3$, —Cl, —CHO, etc., and still fall within the meaning of the present invention which embraces B-amino substituted borazoles.

What is claimed is:
1. As a new chemical compound, B-triaminoborazole.
2. As a new chemical compound, B-tris-(dimethylamino)-borazole.
3. As a new chemical compound, B-tris-(diethylamino)-borazole.
4. As a new chemical compound, B-tris(monomethylamino)-borazole.
5. A method for the preparation of B-triaminoborazole which comprises contacting B-trichloroborazole with excess liquid ammonia followed by removal of unreacted ammonia.
6. A method for the preparation of B-triaminoborazole which comprises contacting B-trichloroborazole with excess liquid ammonia in the presence of an inert solvent, followed by removal of solvent and unreacted ammonia.
7. A method for the preparation of B-tris-(dimethylamino)-borazole which comprises contacting B-trichloroborazole with dimethylamine and isolating B-tris-(dimethylamino)-borazole from the resultant mixture.
8. A method for the preparation of B-tris-dimethylamino)-borazole which comprises contacting B-trichloroborazole with dimethylamine in the presence of an inert solvent and followed by isolation of B-tris-(dimethylamino)-borazole from the resultant mixture.
9. A method for the preparation of B-tris-(diethylamino)-borazole which comprises contacting B-trichloroborazole with diethylamine and isolation of B-tris-(diethylamino)-borazole from the resultant mixture.
10. A method for the preparation of B-tris-(diethylamino)-borazole which comprises contacting B-trichloroborazole with diethylamine in the presence of an inert solvent and followed by isolation of B-tris-(diethylamino)- borazole from the resultant mixture.
11. A method for the preparation of B-tris-(monomethylamino)-borazole which comprises contacting B-trichloroborazole with monomethylamine and isolation of B-tris-(monomethylamino)-borazole from the resultant mixture.
12. A method for the preparation of B-tris-(monomethylamino)-borazole which comprises contacting B-trichloroborazole with monomethylamine in the presence of an inert solvent followed by isolation of B-tris-(monomethylamino)-borazole from the resultant mixture.
13. B,B',B''-triaminoborazoles of formula

$$[B(NRR')NH]_3$$

wherein R and R' are hydrogen or lower alkyl.
14. A method for the preparation of B,B',B''-triaminoborazoles of formula [B(NRR')NH]$_3$, which method comprises contacting a B-trihalogenoborazole with an amine of formula RR'NH wherein R and R' are hydrogen or lower alkyl and isolating the said B,B',B''-triaminoborazoles from the resultant mixture.
15. A method for the preparation of B,B',B''-triaminoborazoles of formula [B(NRR')NH]$_3$, which method comprises contacting a B-trihalogenoborazole with an amine of formula RR'NH wherein R and R' are hydrogen or lower alkyl in the presence of an inert solvent and isolating the said B,B'B''-triaminoborazoles from the resultant mixture.

No references cited.